US010011496B2

(12) United States Patent
Myhre et al.

(10) Patent No.: US 10,011,496 B2
(45) Date of Patent: Jul. 3, 2018

(54) PROCESS FOR THE PRODUCTION OF SILICON DIOXIDE PARTICLES

(71) Applicant: ELKEM AS, Oslo (NO)

(72) Inventors: Bjorn Myhre, Kristiansand S (NO); Magne Dastol, Kristiansand (NO)

(73) Assignee: ELKEM AS, Oslo (NO)

(*) Notice: Subject to any disclaimer, the term of this patent is extended or adjusted under 35 U.S.C. 154(b) by 0 days.

(21) Appl. No.: 15/107,769

(22) PCT Filed: Feb. 23, 2015

(86) PCT No.: PCT/NO2015/050039
§ 371 (c)(1),
(2) Date: Jun. 23, 2016

(87) PCT Pub. No.: WO2015/126262
PCT Pub. Date: Aug. 27, 2015

(65) Prior Publication Data
US 2016/0318769 A1    Nov. 3, 2016

(30) Foreign Application Priority Data

Feb. 24, 2014 (NO) .................................... 20140237

(51) Int. Cl.
C01B 33/18 (2006.01)

(52) U.S. Cl.
CPC ........ *C01B 33/182* (2013.01); *C01P 2002/02* (2013.01); *C01P 2004/32* (2013.01); *C01P 2006/12* (2013.01)

(58) Field of Classification Search
None
See application file for complete search history.

(56) References Cited

U.S. PATENT DOCUMENTS

| 2,573,057 A | 10/1951 | Porter |
| 2,862,792 A | 12/1958 | Rehm |
| 3,194,634 A | 7/1965 | Yelnik et al. |
| 4,301,060 A | 11/1981 | Underwood et al. |
| 5,139,980 A * | 8/1992 | Nakahara ................ C01B 13/32 423/335 |
| 6,495,114 B1 | 12/2002 | Debras |

FOREIGN PATENT DOCUMENTS

| CN | 1134395 A | 10/1996 |
| CN | 1620404 A | 5/2005 |
| CN | 102249240 A | 11/2011 |
| DE | 2443130 A1 | 3/1975 |
| EP | 1361195 A1 | 11/2003 |
| JP | 2002154820 A | 5/2002 |
| JP | 2012227449 A | 11/2012 |
| WO | 00/58214 A1 | 10/2000 |

OTHER PUBLICATIONS

International Search Report dated Jun. 2, 2015 for PCT/NO2015/050039.
Norwegian Search Report for Patent Application No. 20140237.
Written Opinion for PCT/NO2015/050039.
First Office Action and Search Report dated Jun. 9, 2017 for corresponding Chinese Patent Application 201580007950.X.
Office Action dated Aug. 16, 2017 for corresponding Japanese Patent Application 2016-551273.
Supplementary European Search Report dated Aug. 4, 2017 for corresponding European Patent Application EP 15 75 1855.

* cited by examiner

*Primary Examiner* — Wayne Langel
(74) *Attorney, Agent, or Firm* — Lucas & Mercanti, LLP

(57) ABSTRACT

The present invention relates to a process for producing spherical submicron particles of amorphous silicon dioxide, in which silicon dioxide and a reducing agent is injected into a reaction vessel of zirconium oxide in molten state, said zirconium oxide is serving as a heat reservoir, in which silicon dioxide reacts with the reducing agent producing a silicon-sub-oxide vapor, said silicon-sub-oxide vapor is oxidized into said spherical submicron silicon oxide particles.

7 Claims, No Drawings

US 10,011,496 B2

PROCESS FOR THE PRODUCTION OF SILICON DIOXIDE PARTICLES

CROSS REFERENCE TO RELATED APPLICATION

This Application is a 371 of PCT/NO2015/050039 filed on Feb. 23, 2015 which, in turn, claimed the priority of Norwegian Patent Application No. 20140237 filed on Feb. 24, 2014, both applications are incorporated herein by reference.

TECHNICAL FIELD

The present invention comprises a process for producing spherical submicron particles of amorphous silicon dioxide. In addition the present invention includes the spherical submicron particles of amorphous silicon dioxide produced thereby.

BACKGROUND ART

According to prior art submicron amorphous silicon dioxide particles are produced from the off-gases from furnaces such as silicon- and ferrosilicon furnaces. Elkem AS has for many years been developing the technology concerning the off gases from different furnaces and the production of fine amorphous silicon dioxide particles (microsilica). The microsilica particles generally have a particle size of about 0.15 microns and a surface area (BET) of between 20 and 30 $m^2/g$. The relatively high specific surface area is for some applications, such as concrete, a disadvantage due to low flow properties of the microsilica particles.

The amorphous silicon dioxide particles obtained from the above process do however have the drawback that the composition and colour vary with varying furnace operation and also with varying raw materials used for the production of silicon or ferrosilicon. The $SiO_2$ content may thus vary from 99% by weight down to 70% by weight and the colour may vary from black to white.

Fine amorphous silicon dioxide particles are used in numerous applications such as concrete, refractory materials, ceramic materials, filler in plastic and rubber.

It is further known to produce submicron silicon dioxide particles by burning inorganic silanes. This process is however very costly.

The object of the present invention is thus to provide a stable and accelerated process for producing spherical submicron amorphous silicon dioxide particles having a high and consistent purity and a consistent colour.

DESCRIPTION OF THE INVENTION

The object of the present invention is to overcome the disadvantages of existing technologies and provide a stable and accelerated process for the production of submicron amorphous silicon dioxide.

The object of the present invention is to produce silicon sub-oxide vapours that are allowed to react with oxygen thereby forming submicron silicon dioxide particles being of a spherical amorphous nature.

The source of the combustible silicon sub-oxide gases is a reaction vessel in which a pool of reactants at adequate temperature is kept with the aid of a suitable heating arrangement.

The principle is to let a silicon dioxide source react with a reducing agent thereby producing silicon sub-oxide that serves as the combusting media. The production of gaseous sub oxides by the partial reduction of the silicon dioxide is normally a heat consuming reaction. The existence of such a heat reservoir therefore facilitates and stabilise the process.

The present invention comprises a process for producing spherical submicron particles of amorphous silicon dioxide. In the present invention a silicon dioxide source and a reducing agent are added to a reaction vessel containing a zirconium oxide based molten pool. The zirconium oxide based molten pool is serving as a heat reservoir stabilizing the present process. Zirconium oxide is a high melting non-reactive metal oxide.

The zirconium oxide based melt is preferably zirconium oxide, but may also contain less than 10%, and more preferably less than 5% by weight of other elements. If the zirconium based melt contains other elements the melting point may be lowered to about 2650° C. compared to about 2715° C. for pure zirconium dioxide.

Molten zirconium oxide has a very low vapour pressure and no zirconium sub oxides will be produced that will contaminate the produced silicon dioxide particles. The silicon dioxide reacts with the reducing agent producing a silicon sub-oxide vapour, and said silicon sub-oxide vapour is oxidised into said spherical silicon dioxide particles.

The present invention comprises a process for producing spherical submicron particles of amorphous silicon dioxide, in which silicon dioxide and a reducing agent is injected into a reaction vessel comprising zirconium oxide based molten pool, wherein said zirconium oxide based molten pool is serving as a heat reservoir, in which silicon dioxide reacts with the reducing agent producing a silicon-sub-oxide vapour, SiO, said silicon-sub-oxide vapour is oxidised into said spherical submicron particles of amorphous silicon dioxide.

The temperature of the zirconium oxide based material contained in the vessel is kept and maintained at least at or higher than the melting point of said zirconium oxide based material. The temperature of the zirconium oxide based material is selected from one of the following ranges: 2650-2800° C., 2700-2710° C., 2710-2720° C., 2720-2800° C., 2800-2900° C., 2900-3000° C.

In an embodiment the reducing agent is chosen among a variety of different compounds; however carbon materials, such as coke, coal, carbon black and others is a preferred reducing agent for the production of spherical silicon dioxide particles. Further, the produced silicon-sub-oxide vapour according to the present invention is silicon oxide; SiO. Furthermore, the silicon-oxide vapour is oxidised into spherical amorphous silicon dioxide particles.

In an embodiment of the present invention, a gas is optionally injected into the zirconium oxide based molten pool in order to increase the partial pressure of the metal sub-oxide being released from the pool. The gas is selected from the group consisting of nitrogen or air.

By the process of the present invention very clean silicon dioxide particles are obtained, by selecting clean silicon dioxide and clean carbon reducing agents as reactants. Furthermore, the colour of the produced silicon dioxide particles is white.

The produced silicon dioxide particles possess a spherical morphology. The obtained spherical silicon dioxide particles possess a size selected from one of the following ranges: $10^{-9}$-$10^{-6}$ m, $10^{-9}$-$10^{-8}$ m, $10^{-8}$-$10^{-7}$ m, $10^{-7}$-$10^{-6}$ m.

The produced silicon dioxide particles have, due to the high temperature of producing the silicon sub oxide vapour a lower surface area that microsilica produced according to the prior art. The silicon dioxide particles produced according to the process of the present invention preferably have a specific surface area of between 5 and 15 m$^2$/g and more preferably between 10 and 12 m$^2$/g.

The low specific surface area of the produced silicon dioxide particles has shown to improve the flow when used in refractory castables and Portland cement based mortars and concrete. The improved flow property of the produced silicon dioxide particles has the advantage that less costly dispersing agents need to be added to castables, mortars and concrete.

The present invention comprises spherical submicron particles of amorphous silicon dioxide, particles produced according to process described above.

DETAILED DESCRIPTION OF THE INVENTION

The process of the present invention may also comprise the production of microsilica or spherical submicron particles of amorphous silicon dioxide, SiO$_2$, whereby a mixture of silicon dioxide and the reducing agent carbon are added zirconium oxide based molten pool in a vessel.

The main reaction for preparing the silicon sub-oxide vapour silicon oxide, SiO, is as follows:

$$SiO_2 + C = SiO(g) + CO(g)$$

Thus, the process of the present invention is a carbothermic process.

The pool of molten zirconium oxide based molten pool is kept at temperatures above 2650° C. and preferably above the melting point of pure zirconium oxide. The molten zirconium oxide based material can also be kept at a temperature interval of 2710-2720° C. The vapour pressure of the produced silicon sub-oxide, the SiO vapour pressure, reaches 1 Atmosphere at approximately at 1800° C. In this embodiment the temperature above 2650° C. is much higher than the temperature of approximately 1800° C. required for producing SiO vapour. Thus the molten pool will serve as a heat reservoir. However at the high temperatures as mentioned above, the surface area of the resulting silicon dioxide particles will be modified towards lower surface areas while still being essentially sub-micron. The produced silicon sub-oxide vapour, SiO-gas, is oxidised to SiO$_2$ particles immediately above the bath and recovered in filters such as among others bag house filters.

The molten pool of the zirconium oxide based material of the present invention will serve as a heat reservoir as mentioned above thus stabilizing and accelerating the process for producing spherical submicron particles of an amorphous silicon dioxide. In the present invention zirconium oxide will serve as an almost inert heat reservoir thus the produced spherical submicron particles of silicon dioxide will obtain high purity. In the present invention the obtained purity of the spherical submicron producing spherical submicron particles of amorphous silicon dioxide is at least 99% by weight.

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:

1. A process for producing spherical submicron particles of amorphous silicon dioxide comprising
   injecting silicon dioxide and a reducing agent into a reaction vessel, the reaction vessel comprising a molten pool of zirconium oxide based material, wherein said molten pool of zirconium oxide based material is serving as a heat reservoir, in which silicon dioxide reacts with the reducing agent producing a silicon-sub-oxide vapour, SiO;
   oxidizing the produced silicon-sub-oxide vapour into spherical submicron particles of amorphous silicon dioxide.

2. The process according to any of the preceding claim 1, wherein the temperature of the zirconium oxide based material comprised in the vessel is at least at the melting point of the material.

3. The process according to claim 1, wherein the temperature of the zirconium oxide based molten pool is selected from the group consisting of the following ranges: 2650-2800° C., 2700-2710° C., 2710-2720° C., 2720-2800° C., 2800-2900° C., and 2900-3000° C.

4. The process according to claim 1, wherein said obtained spherical silicon dioxide particles possess a size selected from the group consisting of the following ranges: 10$^{-9}$-10$^{-6}$ m, 10$^{-9}$-10$^{-8}$ m, 10$^{-8}$-10$^{-7}$ m, and 10$^{-7}$-10$^{-6}$ m.

5. The process according to claim 1, wherein the reducing agent is carbon.

6. The process according to claim 1, wherein a gas is injected into the zirconium oxide.

7. The process according to claim 6, wherein the gas is an inert gas or nitrogen.

* * * * *